350-171

SR

XR 3,914,787

United States Patent [19]

Sekiguchi

[11] 3,914,787

[45] Oct. 21, 1975

[54] COLOR TELEVISION CAMERA WITH A COLOR-RESOLVING OPTICAL SYSTEM

[75] Inventor: Takeshi Sekiguchi, Tokyo, Japan

[73] Assignee: Canon Kabushiki Kaisha, Tokyo, Japan

[22] Filed: Feb. 8, 1974

[21] Appl. No.: 440,735

[30] Foreign Application Priority Data

Feb. 16, 1973 Japan .............................. 48-18306

[52] U.S. Cl. .............................. 358/50; 358/55 X
[51] Int. Cl.² .............................. H04N 9/09
[58] Field of Search .............................. 358/50, 55

[56] References Cited

UNITED STATES PATENTS

| | | | |
|---|---|---|---|
| 2,733,291 | 1/1956 | Kell | 358/55 X |
| 3,293,357 | 12/1966 | Doi et al. | 358/55 |
| 3,558,809 | 1/1971 | Aoki | 358/50 |
| 3,718,751 | 2/1973 | Landre et al. | 358/50 |

FOREIGN PATENTS OR APPLICATIONS

| | | | |
|---|---|---|---|
| 1,051,065 | 12/1966 | United Kingdom | 358/50 |

*Primary Examiner*—Robert L. Griffin
*Assistant Examiner*—Mitchell Saffian
*Attorney, Agent, or Firm*—Fitzpatrick, Ceila, Harper & Scinto

[57] ABSTRACT

A color television camera with a color-resolving optical system includes an objective lens. A diverging lens is disposed in the back-focus portion of the objective lens to make the axial convergent light from the object lens into a substantially afocal light beam. At least one color-selecting reflective filter is provided in the path of the afocal light. A converging lens is disposed in the path of the light from the color-selecting reflective filter to converge the substantially afocal light from the filter and direct it onto a pickup tube.

2 Claims, 3 Drawing Figures

COLOR TELEVISION CAMERA WITH A COLOR-RESOLVING OPTICAL SYSTEM

BACKGROUND OF THE INVENTION

1. Field of the Invention

This invention relates to a color television camera with a color resolving optical system in which the distance from the final refracting surface of its objective lens to the pickup tube is reduced.

2. Description of the Prior Art

There are various types of the color television camera which has a color-resolving optical system. British Pat. No. 1,207,282 issued Sept. 20, 1970, for instance discloses television camera having field lens and a relay lens disposed between the objective lens and the pickup tube and further having a color-resolving optical system disposed in the relay lens.

In order to permit a color-resolving optical system to be disposed between the objective lens of such television camera and pickup tube, the distance between the final refracting surface of the objective lens and the pickup tube must be long enough to accommodate therein the color-resolving optical system.

In the aforesaid British patent, therefore, a field lens and a relay lens are employed to provide an increased distance between the final refracting surface of the objective lens and the pickup tube. The color-resolving optical system is disposed between the forward and the rearward group of the relay lens. Such optical arrangement has been disadvantageous in that it increases not only the length of the portion for accommodating the color-resolving optical system but also the length of other portion. In other words, the distance between the final refracting surface of the objective lens and the first refracting surface of the relay lens is increased. This has led to the enlarged size of such conventional television camera.

SUMMARY OF THE INVENTION

An object of the present invention is to provide, in a television camera, a reduced distance between the final refracting surface of objective lens and the pickup tube while keeping the distance long enough to accommodate therein a color-resolving optical system.

Such an object of the present invention may be achieved by disposing a diverging lens in the back-focus portion of the objective lens to make the axial convergent light from the objective lens substantially afocal, and by disposing color-selecting reflective filter means in the path of the afocal light and passing the substantially afocal light from the filter means through a converging lens to converge it onto the pickup tube.

The invention will become more fully apparent from the following detailed description of some specific embodiments thereof taken in conjunction with the accompanying drawings.

DESCRIPTION OF THE PREFERRED EMBODIMENTS

Figure 1:
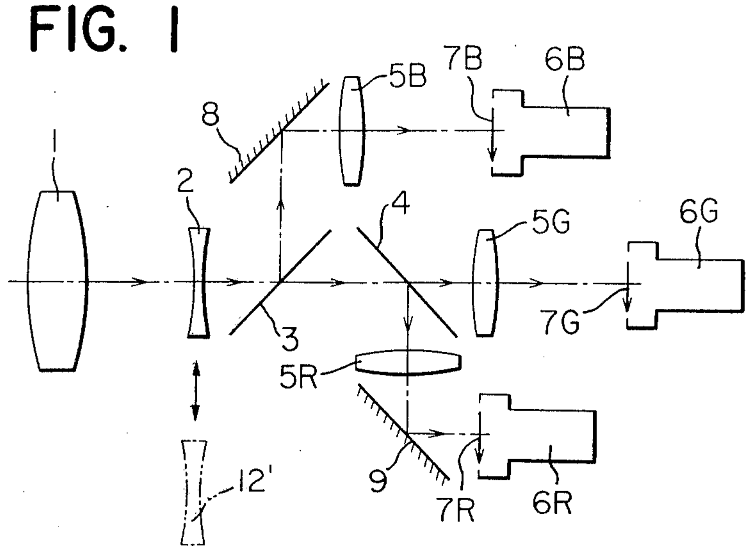
FIG. 1 is a schematic representation of a first embodiment of the present invention.
Figure 2:
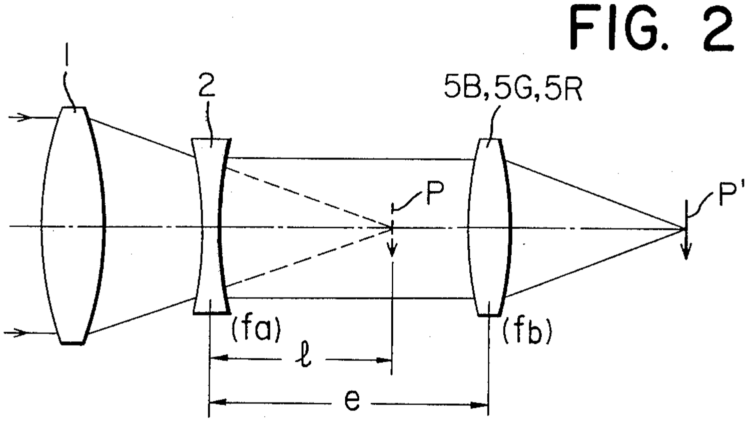
FIG. 2 schematically illustrates the essential portions of the FIG. 1 embodiment.

Referring to FIG. 1, which shows the first embodiment of the television camera according to the present invention, an objective lens, designated by reference numeral 1, may be either a composite focal lens (zoom lens) or a single lens. Light from the objective lens 1 is a convergent light beam to form an image. A diverging lens 2 is disposed in the path of the convergent light beam. The lens 2 may be constructed with a plurality of component lenses. The convergent light from the objective lens 1 is made substantially afocal by this diverging lens 2. Disposed in the path of the afocal light beam are color-selecting reflective filters 3 and 4, which are inclined with respect to the optical axis. These filters differ in their characteristics. In the shown embodiment, the filter 3 reflects the blue color component and transmits the other color components, while the filter 4 reflects the red color component and transmits the green color component. There are further provided converging lenses 5B, 5G and 5R which receive the afocal lights from filters 3 and 4. Each of these converging lenses 5B, 5G and 5R may be constructed with a plurality of component lenses. The afocal light beams from the filters 3 and 4 are made into convergent light beams by the lenses 5B, 5G and 5R, respectively. The functions of the lenses 2, 5B, 5G and 5R are more particularly illustrated in FIG. 2.

Pickup tubes 6B, 6G and 6R are provided so that blue, green and red images 7B, 7G and 7R may be formed on the image receiving surfaces of the pickup tubes through the lenses 5B, 5G and 5R, respectively. In FIG. 1, three pickup tubes are shown, but in the case of a two-tube system television camera, the number of the pickup tube may be two. A mirror 8 is provided to receive the light reflected by the filter 3. By this mirror 8, the blue component light reflected by the filter 3 is made to travel in parallel with the optical axis. A mirror 9 is also provided to receive the red component light reflected by the filter 4 and to cause such light to travel in parallel with the optical axis. Thus, these mirrors 8 and 9 make it possible to arrange the pickup tubes in parallel relationship. If the parallel arrangement is not desired, the mirrors 8 and 9 may be eliminated.

Since the embodiment according to the present invention is constructed in the afore-described manner, it can reduce the distance between the final refracting surface of the objective lens and the pickup tube.

Now, assume that the focal lengths of the diverging lens 2 and the converging lens 5 be $f_A$ and $f_B$, the distance between the principal plane of the diverging lens 2 and the image forming plane P of the objective lens 1 be $l$, and the distance between the principal planes of the lenses 2 and 3 be $e$. The ratio $\beta$ of the total focal length of the entire system to the focal length of the objective lens 1 is expressed as follows:

$$\beta = \frac{f_A \cdot f_B}{f_A l + (f_A + l)(f_B - e)}$$

where $\beta>0$, $l>0$, $f_A<0$ and $f_B>0$. Therefore, even if the ratio is set to be 1 ($\beta=1$) and the distance $e$ between the principal planes of the diverging lens 2 and the converging lens 5 is so selected that the resolving surface of the color-resolving system can be provided between the two lenses 2 and 5, the foregoing equation can be satisfied by giving appropriate values to $l$, $f_A$ and $f_B$, respectively. Also, in this case, it will be apparent that the values of $\beta$ is varied by replacing the diverging lens 2 or the converging lens 5 with that having different focal length, hence the size of the image P' change. In a special case where, for example, the divergent light beam from the diverging lens 2 becomes a completely parallel light beam, i.e. in the case of $f_A=-l$, the above equation will be replaced by:

$$\beta = -f_A/f_B$$

which does not include $e$. Thus, in such case, the distance between the two diverging and converging lenses can be freely selected independently of $\beta$. Accordingly, by replacing the diverging lens or the converging lens with that having a different focal length, it will become possible to vary the size of the formed image or the focal length of the objective lens (in case of a zoom lens, the variable range of the focal length).

Figure 3:
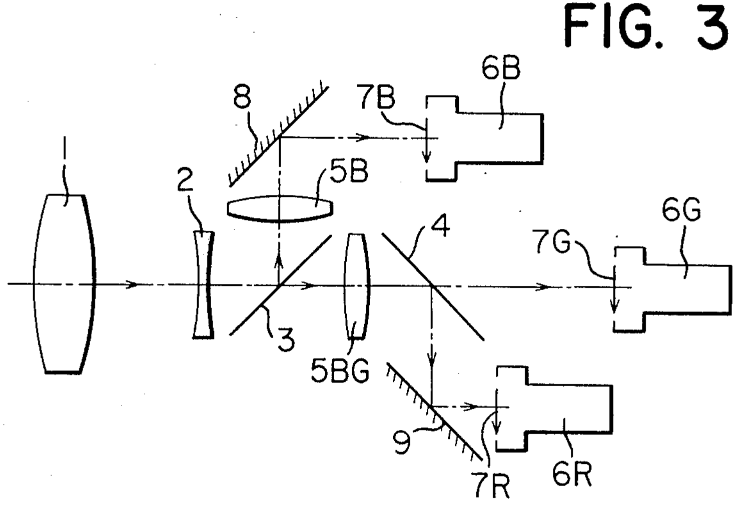
FIG. 3 is a schematic representation of a second embodiment of the present invention.

In the first embodiment as described above, the two color-selecting filters 3 and 4 are interposed between the diverging lens 2 and the converging lens 5, but the television camera of the present invention may take an alternative form as shown in FIG. 3, wherein one color-selecting filter 3 is disposed between the diverging lens 2 and the converging lens 5 while the other color-selecting filter 4 is disposed in the back-focus portion of the converging lens 5.

According to the present invention, as has been described in the foregoing, there is provided a compact color television camera which has eliminated any useless space behind the objective lens and in which the size of the formed image or the focal length of the objective lens (in case of a zoom lens, the variable range of the focal length) can be simply varied without necessity for interchanging the objective lens.

I claim:

1. A television camera provided with a color-resolving optical system comprising:

an objective lens having a relatively short back focus portion;

first, second and third pickup tubes;

a diverging lens disposed in the back-focus portion of said objective lens;

a first color-separating filter disposed in the path of light from said diverging lens to separate the light from said diverging lens into a light beam including one color component light and another light beam including the other two color component lights;

a first converging lens disposed in the path of said light beam including said one color component light from said first filter to form a first image on said first pickup tube;

a second converging lens disposed in the path of said light beam including said other two color component lights from said second filter; and a second color-separating filter disposed in the back-focus portion of said second converging lens to separate the light beam from said second converging lens into two monochromatic component lights and direct them to said second and third pickup tubes, respectively.

2. A television camera provided with a color-resolving optical system, which comprises in combination:

a. an objective lens having a relatively short back focus portion;

b. first, second, and third pickup tubes, all being disposed in parallel with the optical axis of said objective lens;

c. a diverging lens disposed in the back focus portion of said objective lens;

d. a first color-separating filter disposed in the path of light from said diverging lens to separate the light from said diverging lens into a light beam including one color component light which is travelling in deviation from said optical axis of said objective lens, and another light beam including the remaining two color component lights which are travelling along the optical axis of said objective lens;

e. a first mirror member disposed in the path of said light beam which is travelling in deviation from said optical axis to convert the same into a light beam which is travelling in parallel with said optical axis;

f. a first converging lens disposed in the path of said one color component light beam to form an image on said first pickup tube;

g. a second converging lens disposed in the path of said light beam including said remaining two color component lights from said first color-separating filter;

h. a second color-separating filter disposed in the back focus portion of said second converging lens to separate the light beam from said second converging lens into a light beam including one color component light which is travelling in deviation from said optical axis of said objective lens, and another light beam including another color component light which is travelling along the optical axis of said objective lens; and j. a second mirror member disposed in the path of said light beam from said second color-separating filter, travelling in deviation from said optical axis, to convert the same into a light beam which is travelling in parallel with said optical axis.

* * * * *